United States Patent
Fowe

(10) Patent No.: US 9,659,491 B2
(45) Date of Patent: May 23, 2017

(54) DYNAMIC LOCATION REFERENCING STRANDS

(71) Applicant: HERE GLOBAL B.V., Veldhoven (NL)

(72) Inventor: James Fowe, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/663,134

(22) Filed: Mar. 19, 2015

(65) Prior Publication Data
US 2016/0275786 A1    Sep. 22, 2016

(51) Int. Cl.
| G01C 21/00 | (2006.01) |
| G01C 21/28 | (2006.01) |
| G06F 17/00 | (2006.01) |
| G06F 17/40 | (2006.01) |
| G08G 1/01  | (2006.01) |
| G08G 1/052 | (2006.01) |
| G01C 21/36 | (2006.01) |

(52) U.S. Cl.
CPC ......... G08G 1/0125 (2013.01); G08G 1/0104 (2013.01); G08G 1/0129 (2013.01); G08G 1/0141 (2013.01); G08G 1/052 (2013.01); *G01C 21/3691* (2013.01); *G08G 1/012* (2013.01); *G08G 1/0116* (2013.01); *G08G 1/0133* (2013.01)

(58) Field of Classification Search
CPC .. G08G 1/0141; G08G 1/0104; G08G 1/0125; G01C 21/3492; G01C 21/3691; B60W 40/04; G06G 7/76
See application file for complete search history.

(56) References Cited

U.S. PATENT DOCUMENTS

| 5,999,635 A    | 12/1999 | Higashikubo et al.       |
| 6,694,233 B1 * | 2/2004  | Duff .......... G05D 1/0246 340/988 |
| 6,785,606 B2   | 8/2004  | DeKock et al.            |
| 7,116,326 B2   | 10/2006 | Soulchin et al.          |
| 8,055,442 B2 * | 11/2011 | Kim ............ G01C 21/3673 345/442 |
| 8,669,885 B2   | 3/2014  | Swope, III et al.        |
| 2007/0155360 A1* | 7/2007 | An ........... G08G 1/20 455/403 |

(Continued)

OTHER PUBLICATIONS

European Search report for related European Application No. 16160939.1 dated Aug. 29, 2016.

*Primary Examiner* — Thomas G Black
*Assistant Examiner* — Demetra Smith-Stewart
(74) *Attorney, Agent, or Firm* — Lempia Summerfield Katz LLC

(57) ABSTRACT

Systems and methods are described for referencing road strands. Speed data for a set of adjoining road segments is identified. Using at least one of the adjoining road segments, a strand database for is accessed to retrieve a predetermined strand of road segments. An aggregate speed value for the predetermined strand of road segments is calculated based on the speed data for the set of adjoining road segments represented by the predetermined strand of road segments. The aggregate speed value is provided as a representative of traffic on the set of adjoining road segments represented by the predetermined strand of road segments.

17 Claims, 13 Drawing Sheets

(56) References Cited

U.S. PATENT DOCUMENTS

| | | | |
|---|---|---|---|
| 2007/0208497 A1* | 9/2007 | Downs | G08G 1/0104 |
| | | | 701/117 |
| 2007/0208498 A1* | 9/2007 | Barker | G08G 1/0104 |
| | | | 701/117 |
| 2008/0004789 A1 | 1/2008 | Horvitz et al. | |
| 2008/0071465 A1* | 3/2008 | Chapman | G01C 21/3691 |
| | | | 701/117 |
| 2011/0112760 A1* | 5/2011 | Serbanescu | G01C 21/32 |
| | | | 701/465 |
| 2011/0224891 A1* | 9/2011 | Iwuchukwu | G08G 1/096716 |
| | | | 701/117 |
| 2011/0288756 A1 | 11/2011 | Chapman et al. | |
| 2011/0307165 A1* | 12/2011 | Hiestermann | G01C 21/32 |
| | | | 701/119 |
| 2012/0276847 A1 | 11/2012 | Peterson | |

* cited by examiner

140

| Link ID | Direction | Speed | Functional Class | Strand | Index | Jam Factor |
|---|---|---|---|---|---|---|
| ID1 | NNW | 31 | 4 | Y1 | 11 | 0.64 |
| ID2 | NW | 21 | 4 | Y1 | 12 | 0.55 |
| ID3 | WNW | 12 | 4 | Y1 | 13 | 0.18 |
| ID4 | W | 11 | 3 | Y1 | 14 | 0.20 |
| ID5 | WSW | 15 | 3 | Y1 | 15 | 0.25 |
| ID6 | SW | 25 | 3 | Y1 | 16 | 0.31 |
| ID7 | S | 22 | 3 | Y1 | 17 | 0.30 |

| Link ID | Direction | Speed | Functional Class | Strand | Index | Jam Factor |
|---|---|---|---|---|---|---|
| 14a | E | 31 | 2 | 15a | 1 | Y |
| 14b | E | 34 | 2 | 15a | 2 | Y |
| 14c | E | 30 | 2 | 15a | 3 | Y |
| 14d | E | 23 | 2 | 15b | 1 | R |
| 14e | E | 15 | 2 | 15b | 2 | R |
| 14f | E | null | 2 | 15b | 3 | R |
| 14g | E | 18 | 2 | 15b | 4 | R |

DYNAMIC LOCATION REFERENCING STRANDS

FIELD

The following disclosure relates to strands of road segments, and more particularly to efficient provisioning of traffic related information based on the strands of road segments.

BACKGROUND

Traffic reporting is the study of movement of vehicles on the roads. Analytical techniques may manage and track traffic information in order to derive travel times, guide driving behavior and optimize road infrastructure for cities. Traffic Message Channel (TMC) and other traffic services deliver traffic information to customers. Traffic incidents and traffic flow are reported through broadcasts. Traffic delays may be caused by one or more of congestion, construction, accidents, special events (e.g., concerts, sporting events, festivals), weather conditions (e.g., rain, snow, tornado), and so on.

The traffic data may be collected from probes from individual drivers. The individual drivers may travel with tracking devices (e.g., navigation devices or mobile device). However, the saturation rate of road segments having a tracking device at any given point in time may be quite low. In addition, a penetration rate describing the percentage of vehicles acting as a probe may also be quite low. Thus, the available traffic data may be insufficient to represent a complete traffic map.

SUMMARY

In one embodiment, speed data for a plurality of adjoining road segments is identified, a strand database is accessed for a predetermined strand of road segments corresponding the plurality of adjoining road segments. An aggregate speed value is calculated for the predetermined strand of road segments based on the speed data for the plurality of adjoining road segments represented by the predetermined strand of road segments. The aggregate speed value is provided as a representative of traffic on the plurality of adjoining road segments represented by the predetermined strand of road segments.

In one embodiment, location data indicative of a road segment is sent to a traffic service. In response, traffic data for a road strand of a plurality road segments including the road segment is received. The traffic data is based on an aggregate speed value for the strand of road segments based on the speed data for the plurality of adjoining road segments represented by the predetermined strand of road segments. The traffic data is provided as a representative of traffic on the plurality of adjoining road segments represented by the predetermined strand of road segments.

BRIEF DESCRIPTION OF THE DRAWINGS

Exemplary embodiments of the present invention are described herein with reference to the following drawings.

DETAILED DESCRIPTION

Figure 1:
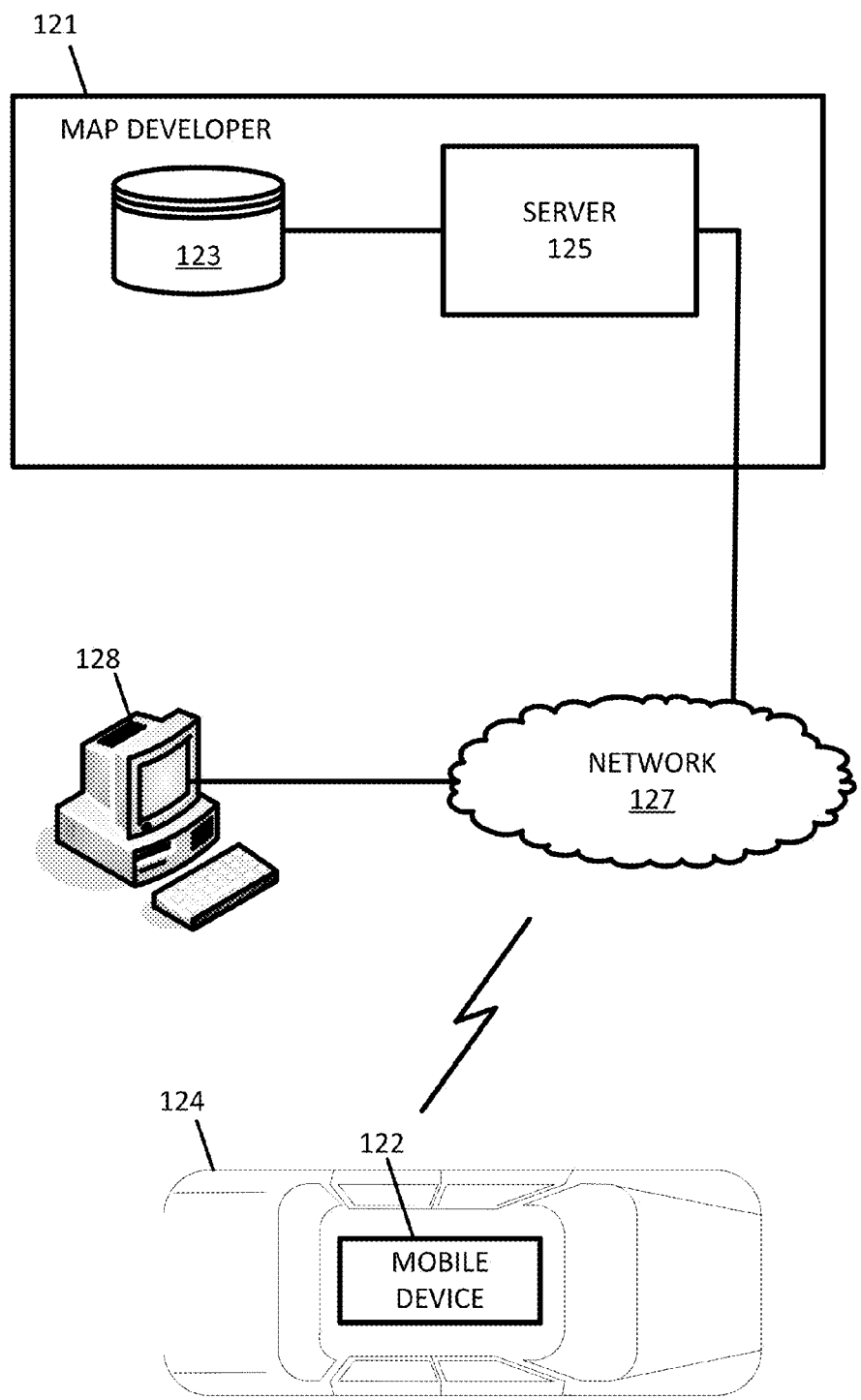
FIG. 1 illustrates an example system for creating and providing traffic road strands.

Traffic data may be provided to users from a traffic service provider (TSP). Traffic data may originate with probes. A probe may be a mobile device or tracking device that provides samples of data for the location of a vehicle. The probes may be mobile phones running specialized applications that collect location data as people drive along roads as part of their daily lives. Traffic data may also be collected with a stationary sensor such as an inductance loop or optical detector (e.g., camera, light detection and ranging (LiDAR), or radar device). The probe data and stationary sensor data may report the quantity, frequency, or speed of vehicles as they travel road segments. The road segment may be determined based on the geographical coordinates of the probe (e.g., global positioning system (GPS)).

Traffic data may be presented according to individual road segments. A road segment may be data representing a length of road. Road segments may be defined according to nodes or intersections. For example, a road segment may extend from one node to another node. In rural areas, road segments may be relatively large because the distances between intersections are lengthy. In urban areas, road segments may be relatively small because the distances between intersections are short.

Traffic data may be presented on a display of a map by applying a traffic indicator to the road segments. The traffic indicator may be coloring, shading, moving icons, labeling, or other indicators. For example, green may represent no congestion, yellow may represent slowed but flowing traffic, red may represent significantly slowed traffic, and black may represent substantially stopped traffic.

The traffic data for probes may not be complete. For example, no mobile devices may be traveling on a particular road segment or no stationary sensors may exist for a particular road segment. In addition, the penetration rate of the number of vehicles having a probe may be low. When there is no traffic probe or sensor for a particular road segment, no traffic data is presented for that road segment. Thus, the map may include a visible omission or lack of traffic data for the road segment missing traffic data.

The following embodiments provide a solution for the visible omission or lack of traffic data by using road strands. A road strand may be defined as a sequence of similarly situated road segments. The road strand may be a compound road segment. The road strand may be defined geographically, according to a user selection, or according to historic traffic. The road strand may include a set of road segment identifiers belonging to the strand. A single traffic value may be assigned to the road strand to represent traffic levels on all of the road segments assigned to the road strand.

The road strands also improve the efficiency of a traffic system. A single traffic value may be transmitted to represent multiple road segments. This lowers the bandwidth required to distribute traffic information. In some distribution systems, such as radio transmission, bandwidth may be limited. The road strands also eliminate holes or omissions in the traffic data by applying the road stand over road segments without traffic probes.

FIG. 1 illustrates an example map developer system 120 for creating road strands and distributing traffic data according to the road strands. The system 120 includes a developer system 121, one or more mobile devices 122, a workstation 128, and a network 127. Additional, different, or fewer components may be provided. For example, many mobile devices 122 and/or workstations 128 connect with the network 127. The developer system 121 includes a server 125 and one or more databases. The database 123 may be a geographic database including road links or segments. The mobile devices 122 may be associated with vehicles 124.

The server 125 may receive or identify speed data or traffic data for a plurality of adjoining road segments. The speed data may be collected from various types of probes, including mobile phone, navigation devices, sensors, or analysis of camera images.

The server 125 may access a strand database (e.g., database 123) for a predetermined strand of road segments. The predetermined strand of road segments is based on road attributes, historic data, or other factors. The server 125 may analyze the road segments in the database 123 to determine the construction of road strands or compound road segments. The construction of the road strands defines what road segments are included. The construction of the road strands may be determined ahead of the time the road strand is used. The predetermined construction of the road strands may be based on the geometry of the road segments, historical traffic data for the road segments, or attributes of the road segments.

The server 125 may identify the speed data for the road segments in the road strand. The server 125 may calculate an aggregate speed value for the strand of road segments based on the speed data for the adjoining road segments represented by road segments. In one example, the speed data for the road segments is averaged. In another example, the server 125 determines the media speed value. The server 125 may select a congestion state based on the aggregated speed value. The congestion state may be defined by ranges of speeds. Example ranges of speeds include 0 to 5, 6 to 20, 21 to 50, and 51 and above. Any ranges may be used. Example units for the ranges of speeds include miles per hour, kilometers per hour, meters per second, feet per second, or other units. Example ranges of speed include 0 to 20% of the rated speed of the road segment, 21% to 50% of the rated speed of the road segment, 51% to 90% of the rated speed of the road segment, and above 90% of the rated speed of the road segment. The rated speed of the road segment may be defined by the speed limit of the road segment, the average speed of the road segment, or another value. These values may be stored as attributes of road links in the database 123.

The server 125 may provide the aggregate speed value as a representative of traffic on the plurality of adjoining road segments represented by the predetermined strand of road segments. The aggregate speed value may be applied to a road map by color (e.g., green may represent no congestion, yellow may represent slowed but flowing traffic, red may represent significantly slowed traffic, and black may represent substantially stopped traffic), shading or another graphical indicator. The road map may be provided in a mapping application via a website or other program.

The server 125 may provide the aggregate speed value to the mobile device 122. Because the road strand encompasses multiple road segments and can be described by a single traffic value, the efficiency of providing traffic information is improved, and the bandwidth and processing requirements are reduced. In one example, the traffic values or aggregate speed values for road strands are broadcast by messages carried by a radio frequency signal. In another example, the traffic values or aggregate speed values for road strands are distributed over a wireless network (e.g., network 127), which may be cellular, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

The traffic information may be provided using a dynamic location referencing system in which the location reference used to deliver traffic data is created when needed. This system of delivering traffic data to mobile devices is superior to Traffic Message Channel (TMC) and other existing traffic services that deliver (e.g., broadcast) traffic information to customers using static location codes. Rather than publish all traffic data for road segments, the requestor can send a dynamic location code from the requestor's local map database that is map matched to the map database of the traffic provider. Thus, the dynamic location reference system may be provider agnostic and be compatible with all map providers. Combining the dynamic location reference system with the road strands described herein reduces the bandwidth requirements because rather than sending congestion information on several road segments or links by reporting traffic state separately, congestion information is sent for a strand encompassing multiple road segments or links.

Figure 2:
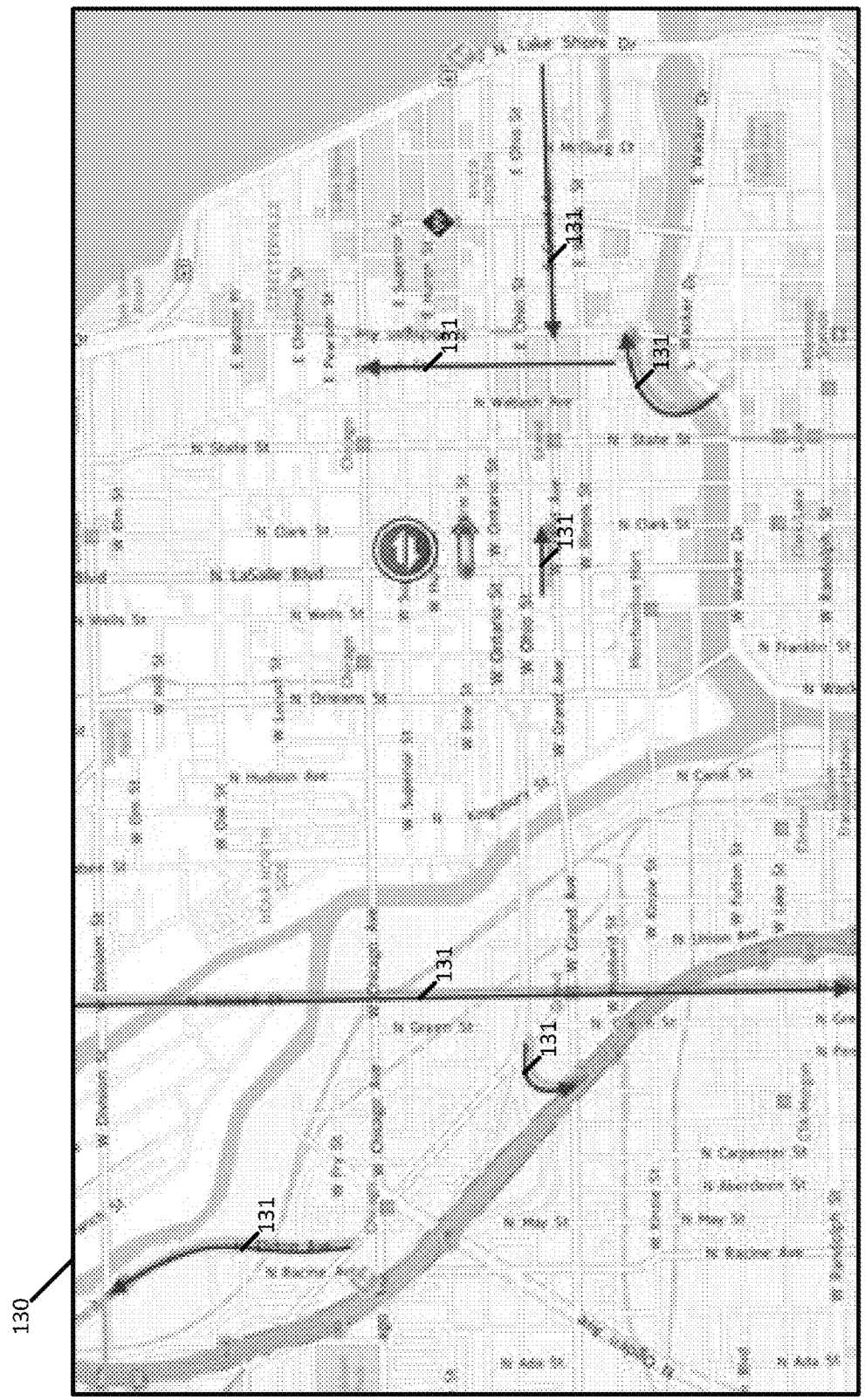
FIG. 2 illustrates an example map including traffic road strands.
Figure 3:
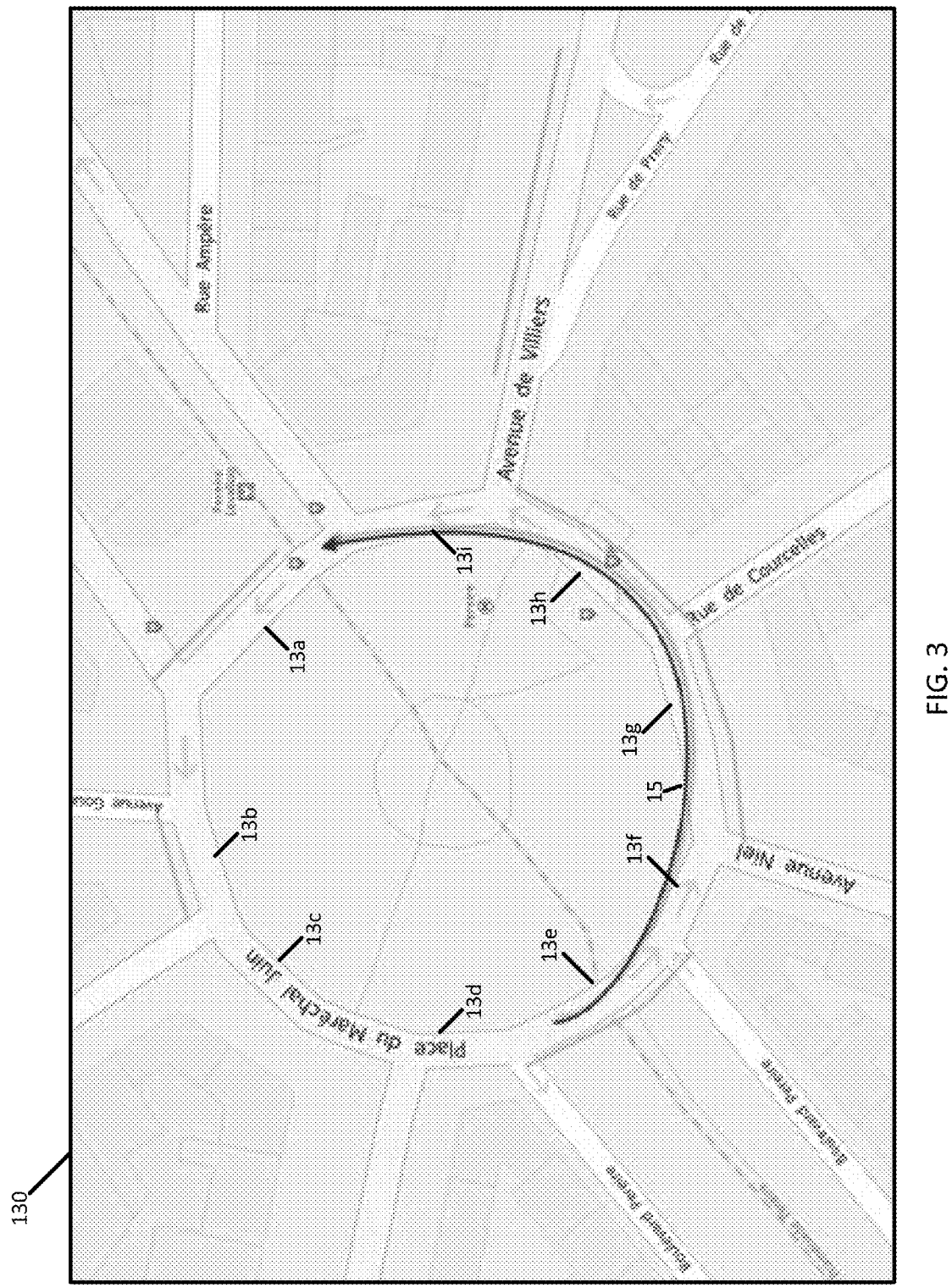
FIG. 3 illustrates another example map including traffic road strands.

FIGS. 2 and 3 illustrate example maps 130 including traffic road strands 131. While the road strands could be illustrated on a user device, the road strands are typically stored as metadata and illustrated only indirectly as the traffic is illustrated on the map. The organization of the road strands may be based on the geometry of the road segments, historical traffic data for the road segments, or attributes of the road segments. Some road strands extends from one street to another. Some road strands follow curves.

The server 125 may analyze the geometry of the road segments. For example, sets of intersecting road segments are analyzed to determine whether the strand should continue through the intersection. The server 125 may compare an angle at which to road segments meet to a threshold angle. When the angle between two roads in the intersection is substantially straight (e.g., the angle exceeds the threshold), the two road segments are assigned to the same road strand. When the angle between two roads in the intersection is not substantially straight (e.g., the angle is less than the threshold), the two road segments are assigned to different road strands.

The server 125 may analyze historical traffic data to determine road segments that should be combined in the same road strand or compound road segment. The server 125 may compare historical speed value to determine whether two road segments experience similar traffic patterns. The server 125 may compare a difference between the speed value from one road segment to that of an adjacent road segment. When the difference is less than a threshold difference, the adjacent road segments are assigned to the same road strand. When the difference exceeds the threshold difference, the adjacent road segments are assigned to different road strands. The comparisons of historical traffic data may be made with median values or mean values averaged over time. Alternatively, individual comparisons may be made for time periods or time epochs. The time epochs may be small intervals such as 15 minute increments. The time epochs may be general distinctions such as rush hour versus non-rush hour, weekday versus weekend days or holidays, or high traffic times versus low traffic times. The server 125 may compare each set of adjacent road segments based on time epochs.

The server 125 may analyze attributes of the road segments to determine which road segments should be combined in the same road strand. Examples attributes include any or a combination of functional classification, speed limit, lane restrictions, or other attributes. When two adjacent road segments (e.g., a road segment leading to an intersection and a road segment leading away from an intersection) have the same functional classification, the adjacent road segments may be assigned to the same road strand. That is, when two adjacent road segments have different functional classifications, the road segments may be assigned to different road strands. When two adjacent road segments have the same speed limit, or speed limits within a predetermined range, the adjacent road segments may be assigned to the same road strand. That is, when two adjacent road segments have different sped limits, the road segments may be assigned to different road strands. When two adjacent road segments have the same lane restrictions, the adjacent road segments may be assigned to the same road strand. For example, a common high occupancy vehicle lane restriction may be an indicator that two adjacent road segments should be assigned to the same road strand.

The server 125 may analyze historical routes to determine which road segments should be combine in the same road strands. For example, the server 125 may identify past travel paths from position data to determine the routes vehicles typically take. Consider a four way intersection in which vehicles entering the intersection on segment A have the option of leaving the intersections on segments B, C, and D. The server 125 may determine whether vehicles choose any of segments B, C, D more than a predetermine portion (e.g., 80%) of the time. If most vehicles chose segment C, then the server 125 may assign the same road segment to segments A and C.

FIG. 3 illustrates a particular road structure, a roundabout, in which the number of road segments is high, leading to a high probability that one or more of the road segments may not have probe data for any given time epoch. Under existing traffic systems, portions of the roundabout may not be illustrated with a traffic indicator. However, as shown in FIG. 3, road segments 13*a-l* may be associated with a single road strand that extends along half or all of the circumference of the roundabout.

Figure 4:
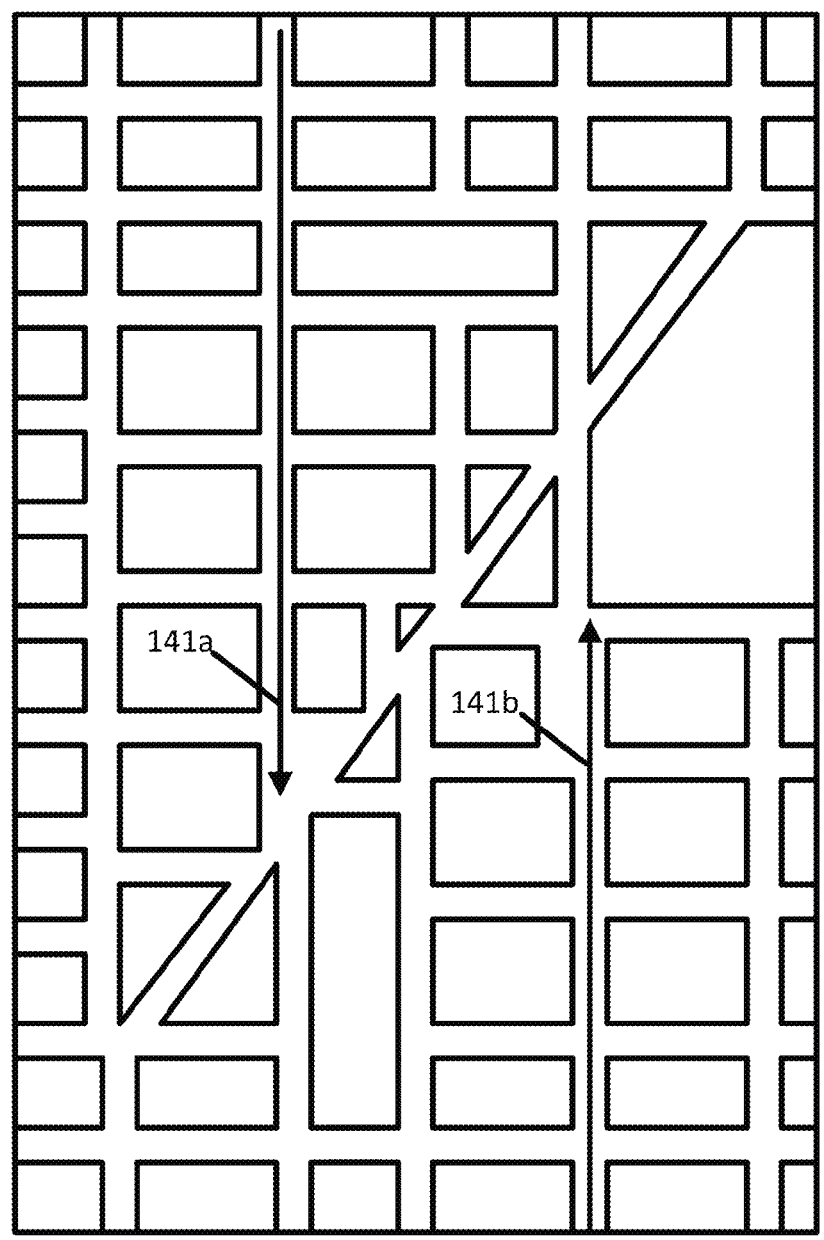
FIG. 4 illustrates another example map including traffic road strands.

FIG. 4 illustrates another example map including traffic road strands 141*a* and 141*b*. The road strands may be unidirectional. For example, road strand 141*a* is associated with a first direction (e.g., south), and road strand 141*b* is associated with a second direction (e.g., north). Two road segments may be associated or combined into the same road strand in one direction but not in the other direction. For example, consider three road segments, A, B, and C. The road segments may be independently grouped according to the geometry of the road segments, historical traffic data for the road segments, or attributes of the road segments. For example, in one direction B and C are grouped together in a road strand, and in the other direction A and B are grouped together in a road strand.

Figure 5:
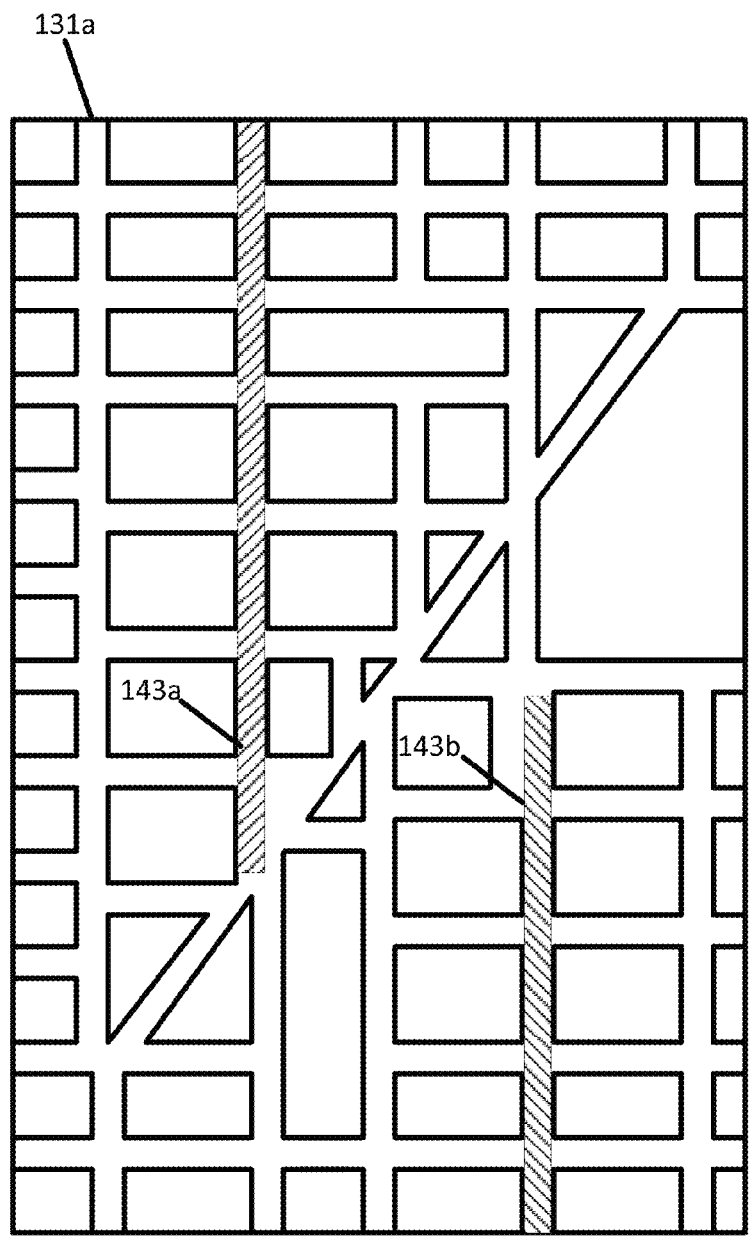
FIG. 5 illustrates a map for the traffic road strands of FIG. 4.

FIG. 5 illustrates a map for the traffic road strands of FIG. 4. One traffic indicator 143*a* is applied to road strand 141*a*, and another traffic indicator 143*b* is applied to road strand 141*b*. The traffic indicator may be shading, as illustrated by FIG. 4. Alternatively, the traffic indicators 143*a* and 143*b* may include distinguishable coloring, shading, moving icons, labeling, or other indicators. For example, green may represent no congestion, yellow may represent slowed but flowing traffic, and red may represent significantly slowed traffic.

Figures 6A, 6B:
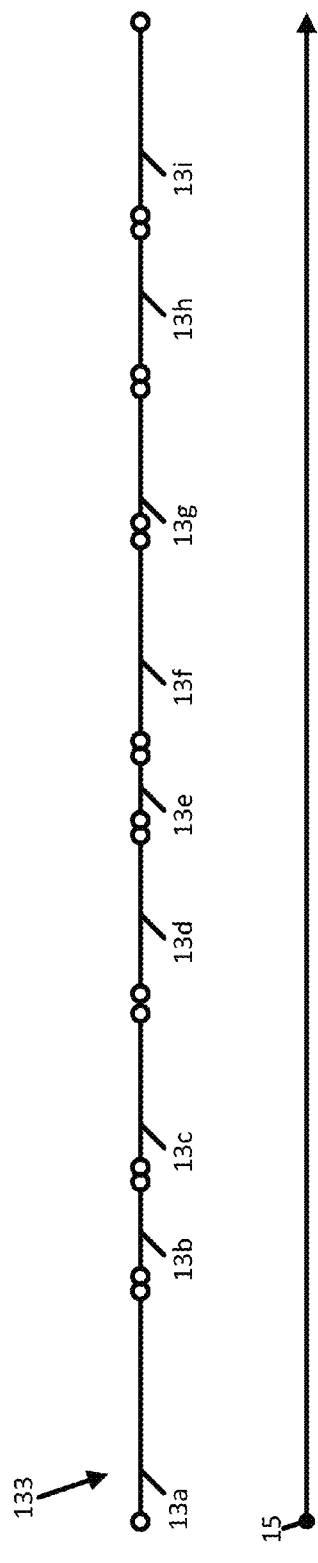
FIG. 6A illustrates a traffic road strand.
FIG. 6B illustrates a table of traffic data for the traffic road strand of FIG. 6A.

FIG. 6A illustrates a traffic road strand 15 that corresponds to a series of road segments 133. The series of road segments 133 may include road segments 13*a-l* illustrated also in FIG. 6. FIG. 6B includes a road strand table 140. The road strand table 140 may be indexed by road segment or link in combination with direction. The road strand table 140 may include link ID paired with a direction (e.g., cardinal directions or secondary-intercardinal directions as illustrate in FIG. 6B).

The road strand table 140 may define the sets of road segments that are grouped together in a road strand. Each road segment in a road strand may be assigned an index. Thus, in road strand table 140, road segments ID1-7 are grouped together in the same road segment and assigned road segment index values 11-17. The road strand table 140 may also include strand identifier (e.g., Y1). Multiple strands may be described by the same table. The road strand table 140 may also include any combination of speed, functional class, and jam factor, which may be used to define the road strand. The jam factor may define the traffic identifier (e.g., color, shading, or other indicator) that is used to describe the road strand. In one example, one range for the jam factor corresponds to one traffic indicator, another range for the jam factor corresponds to another traffic indicator, and a third range for the jam factor corresponds to a third traffic indicator.

Figures 7A, 7B:
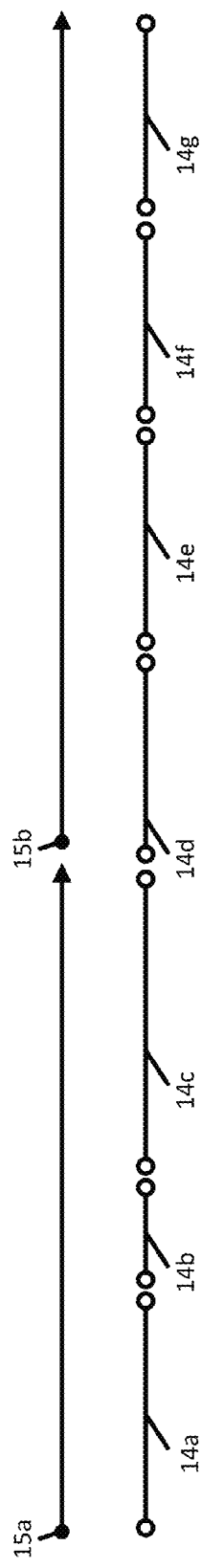
FIG. 7A illustrates two traffic road strands.
FIG. 7B illustrates a table of traffic data for the traffic road strands of FIG. 7A.

FIG. 7A illustrates two traffic road strands 15*a* and 15*b*. Road strand 15*a* represents road segments 14*a-c*, and road strand 15*b* represents road segments 14*d-g*. FIG. 7B illustrates a table 150 of traffic data for the traffic road strands of FIG. 7A. The strands 15*a-b* are listed with the corresponding road segments. The individual road segments are associated with speeds (e.g., traffic values) that are used to select a jam factor for the strand. Thus, the higher speeds may be associated with a color yellow (e.g., Y), and the lower speeds may be associated with a color red (e.g., R).

In some examples, one or more of the road segments may not be associated with any speed data. For example, table 150 illustrates that road segment 14*f* is not associated with a speed value for the particular time epoch. The server 125 may identify a road segment without speed data for a current time epoch. In response, the server 125 may interpolate an estimated speed value for the road segment without speed value. In the example of table 150, the server 125 may average the speed values for adjacent road segments to calculate an estimated speed value. That is, the speed value of road segments 14e and 14g may be averaged (e.g., ½*(15+18)=16.5). In another example, only upstream road segments may be used. For example, the speed value of upstream road segments 14e and 14d may be used to calculate the estimate speed value.

Figure 8A:
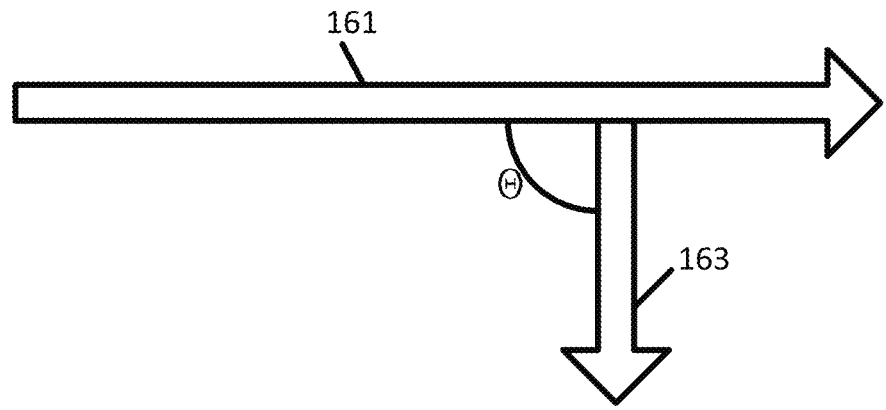
FIGS. 8A and 8B illustrates a pair of adjacent road segments in different traffic road strands.
Figure 8B:
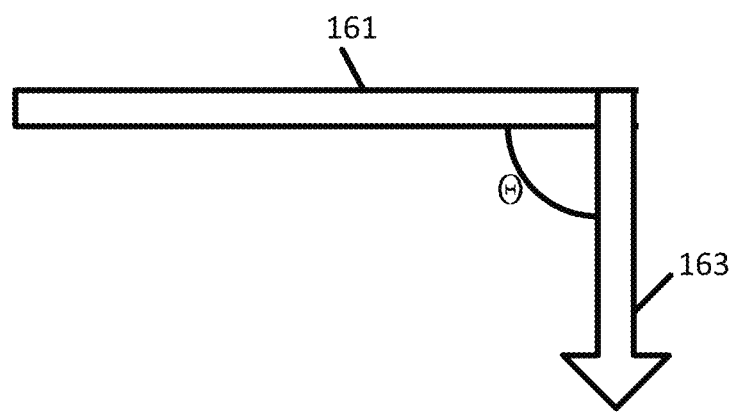

FIGS. 8A and 8B illustrates a pair of adjacent road segments in different traffic road strands. The server 125 may identify an angle (θ) between a pair of adjacent road segments, and compare the angle to a predetermined threshold. Various examples may be used for the angle (e.g., 90, 125, or 150 degrees). When the angle is greater than the predetermined threshold, the pair of adjacent road segments are associated in the same road strand. When the angle is less than the predetermined threshold, the pair of adjacent road segments are not associated in the same road strand. The example of FIGS. 8A-B is for a predetermined threshold of 125 degrees. In FIG. 8A, road segment 161 feeds into road segment 163 at about 90 degrees. Because 90 degrees is less than the threshold, road segments 161 and 163 are not associated with the same road strand.

A different threshold angle may be used when two road segments intersection without another road segment at the intersection. For example, when two road segments connect but there is no other option, they may be combined in the same road segment regardless of the angle between them. In another example, the two road segments may be combined in the same road segment as long as the road segment is greater than an angle (e.g., 60 degrees). In FIG. 8B, road segment 161 feeds into road segment 163 at about 90 degrees, but no route is possible through the intersection. Thus, the road segments likely have similar traffic patterns and are combined in the same road segment.

Figure 9A:
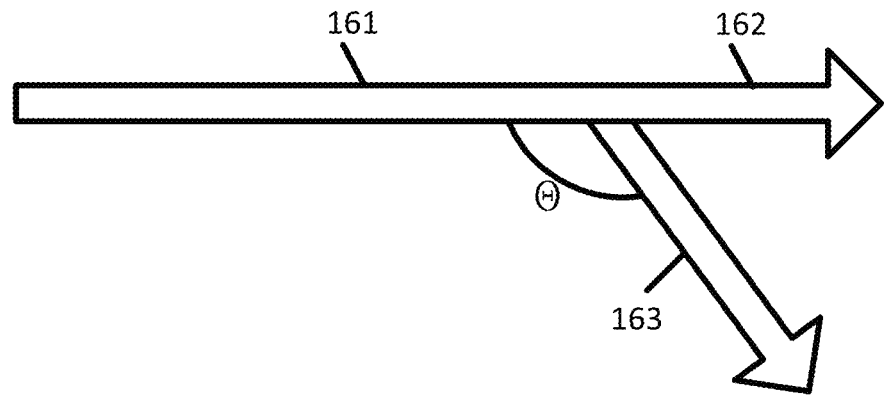
FIG. 9A illustrates a pair of adjacent road segments in a single traffic road strand.
Figure 9B:
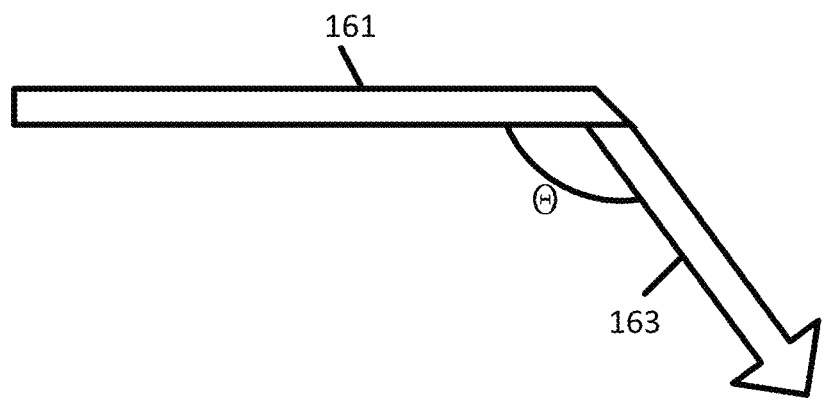
FIG. 9B illustrates a pair of adjacent road segments in different road strands.

FIG. 9A shows an intersection with a turning angle that is greater than the predetermined angle (e.g., 120 degrees) and less than a maximum angle (e.g., 180 degrees). The server 125 may determine that there is another continuous straight stretch of the road segment 162 with angle 180 degrees. Based on the continuation straight stretch of the road segments 162, the server 125 may split the road segment 161 and 163 into two different road strands. FIG. 9B illustrates a road segment similar to FIG. 8B except that the turning angle is greater than the predetermine angle (e.g., 120 degrees). Accordingly, the server 125 combines the two segments into a single strand.

Figure 10:
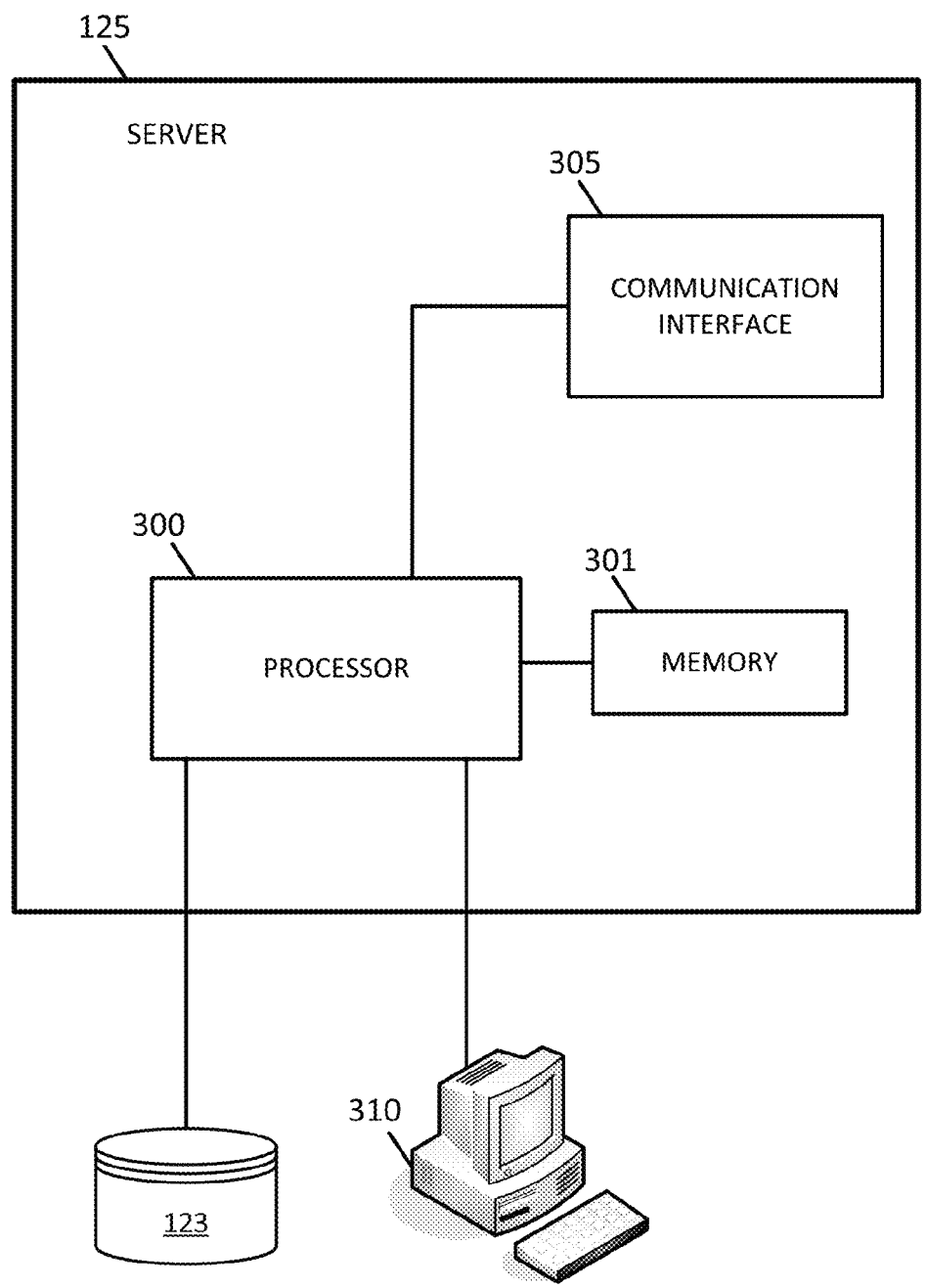
FIG. 10 illustrates an example server of the system for traffic road strands.
Figure 11:
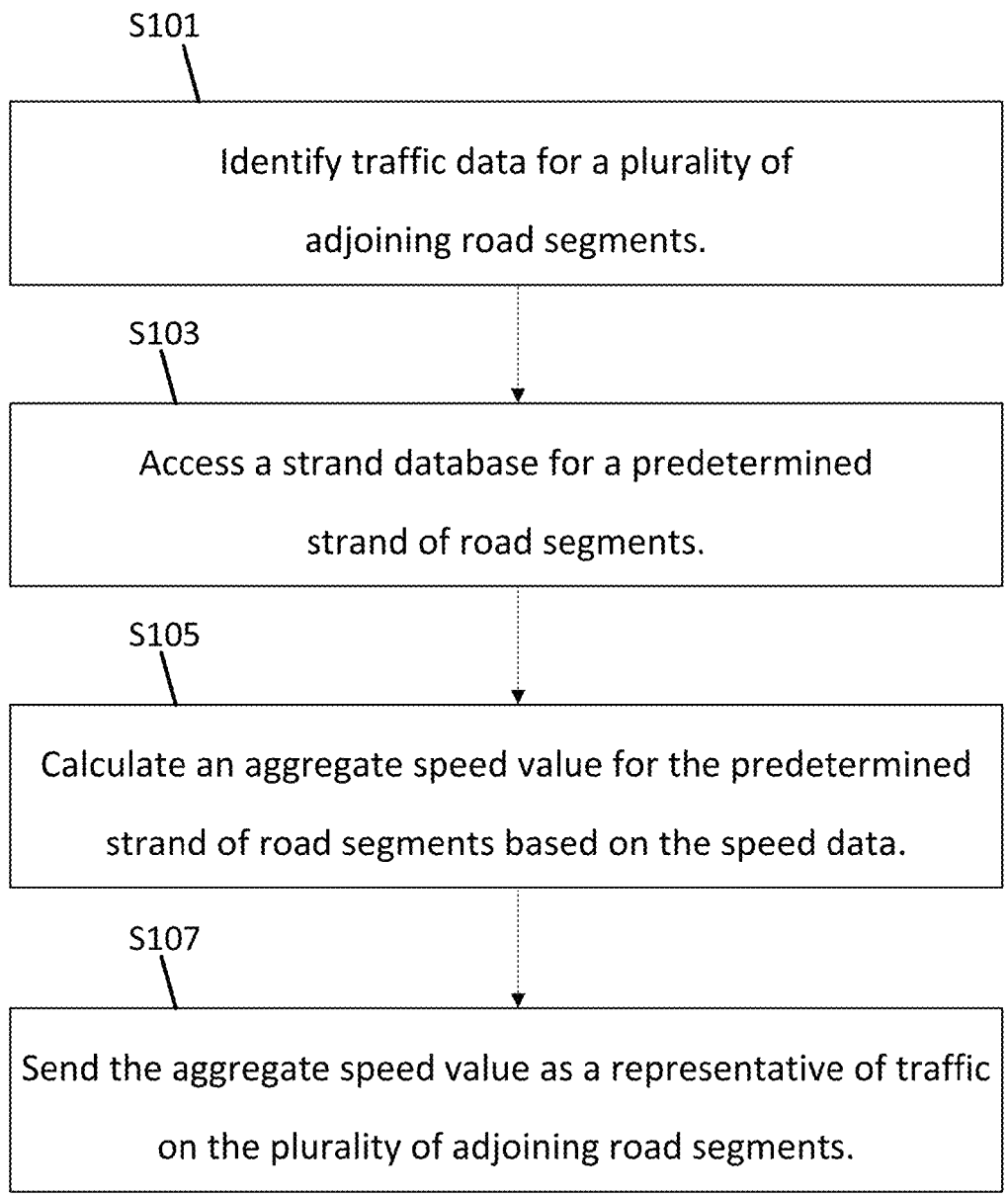
FIG. 11 illustrates an example flowchart for the server of FIG. 10.

FIG. 10 illustrates an example server 125. The server 125 includes a processor 300, a communication interface 305, and a memory 301. The server 125 may be coupled to a database 123 and a workstation 310. The workstation 310 may be used to enter data regarding the technique for constructing the road strands. That is, the user may input a command specifying any combination of real time traffic, historical traffic, road geometry, or routing patterns as the technique for defining the road strands. The database 123 may be a geographic database as discussed above. Additional, different, or fewer components may be provided in the server 125. FIG. 6 illustrates an example flowchart for the operation of server 125. Additional, different, or fewer acts may be provided.

In act S101, the processor 300 identifies traffic data for a plurality of adjoining road segments. The traffic data may be speed values from mobile devices traveling on the road segments. The traffic data may be representative of a quantity of vehicles on the road segments, as measured by traffic sensors or traffic cameras.

In act S103, the processor 300 accesses a strand database using at least one road segment identifier and receives a strand of road segments. The strand of road segments is based on real time data, road attributes, road geometry or historic data. Example techniques for determining the road strand are described above.

In act S105, the processor 300 calculates an aggregate speed value for the predetermined strand of road segments based on the speed data for the plurality of adjoining road segments represented by the predetermined strand of road segments. The aggregate speed value may be a number representing speed (e.g., 40 miles per hour) or a speed category (e.g., free flow, light traffic, or heavy traffic). The aggregate speed value may be an average of the available speed values for the road segments making up the strand. The processor 300 may analyze real time traffic data for the road segments, and define the predetermined strand of road segments according to road segments having real time traffic data that deviates within a predetermined range.

In act S107, the processor 300 or the communication interface 305 sends the aggregate speed value as a representative of traffic on the adjoining road segments represented by the predetermined strand of road segments to another device (e.g., mobile device 122).

The database 123a may be master geographic databases stored in a format that facilitates updating, maintenance, and development. For example, a master geographic database or data in the master geographic database is in a spatial format, such as for development or production purposes. The spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

Figure 12:
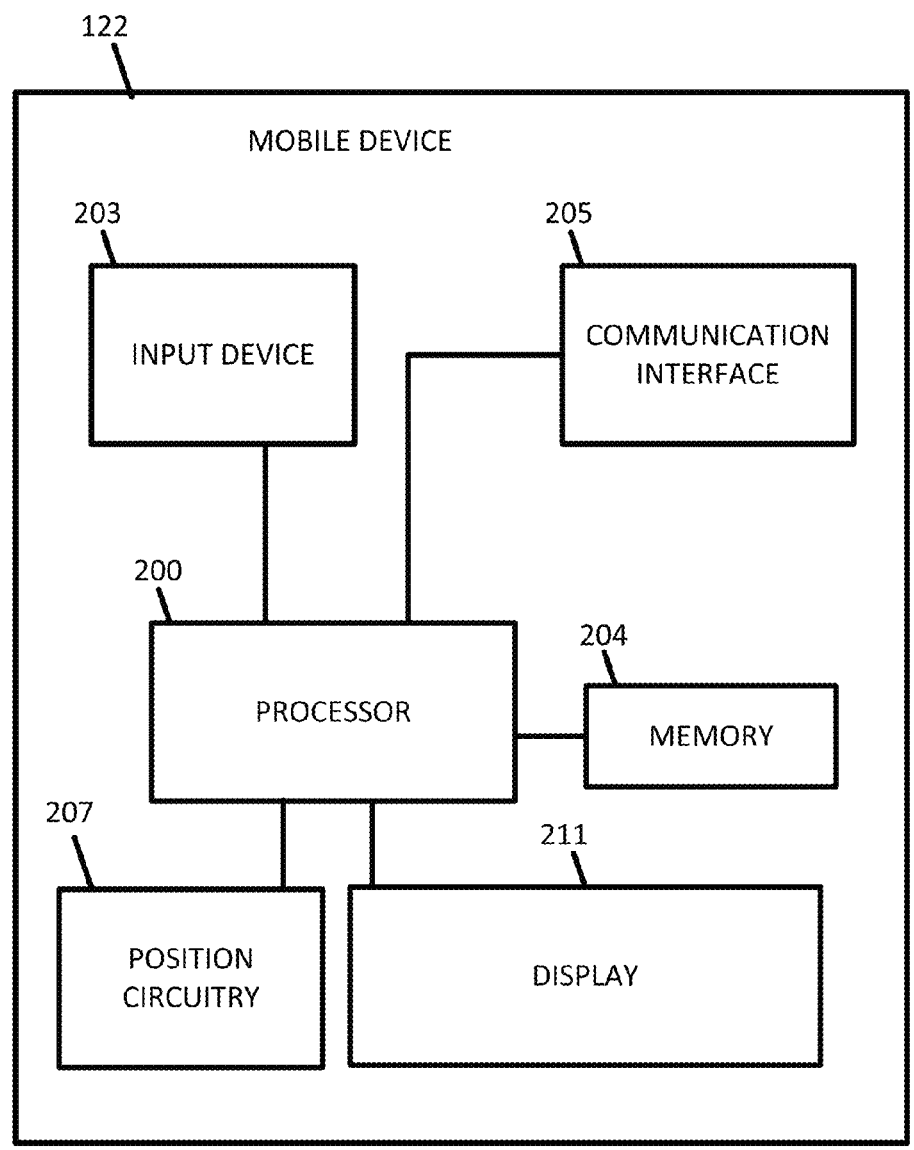
FIG. 12 illustrates an example mobile device in the system for traffic road strands.
Figure 13:
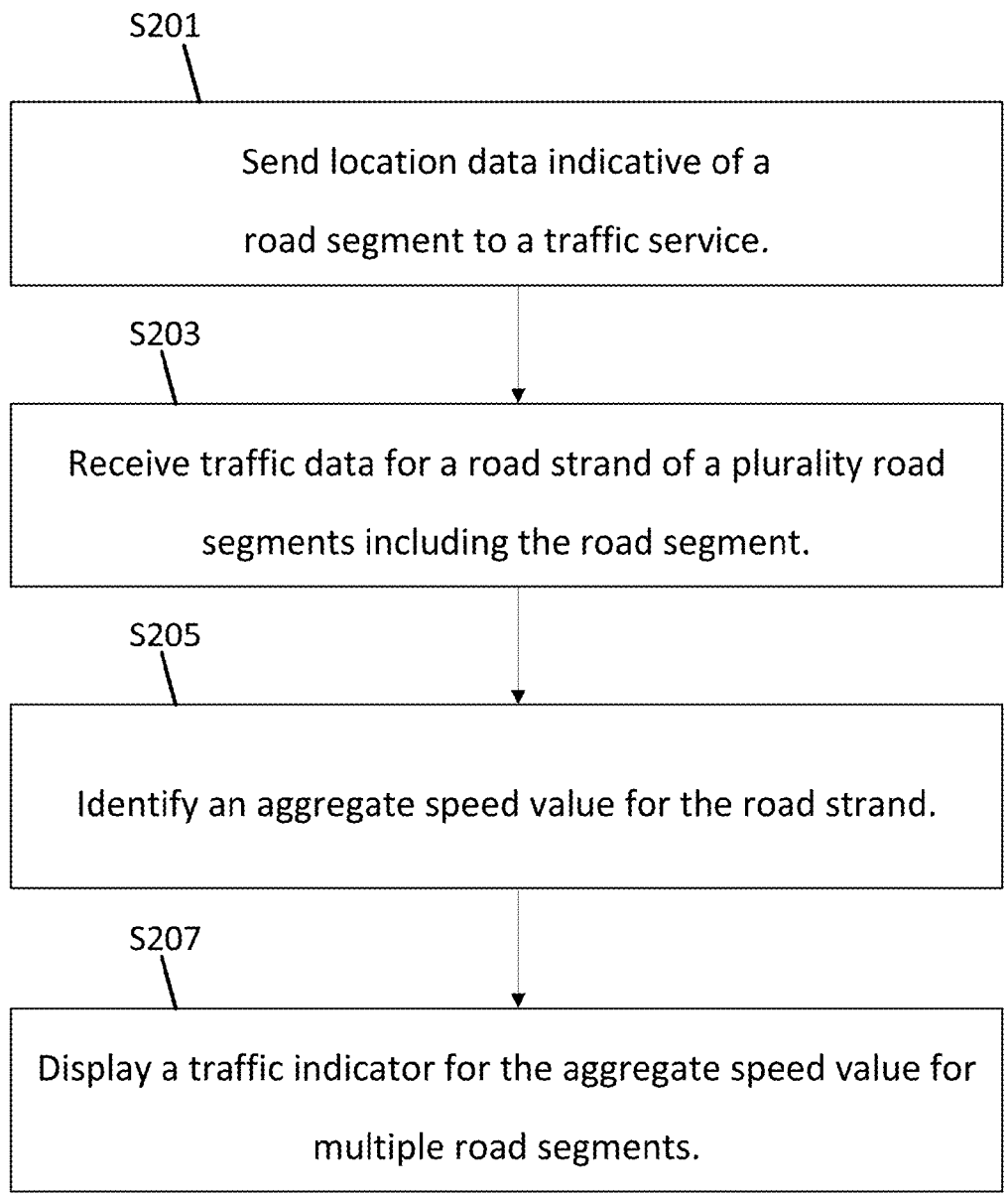
FIG. 13 illustrates an example flowchart for the mobile device of FIG. 12.

FIG. 12 illustrates an exemplary mobile device 122 of the system of FIG. 1. The mobile device 122 includes a processor 200, a memory 204, an input device 203, a communication interface 205, position circuitry 207, and a display 211. Additional, different, or fewer components are possible for the mobile device 122. FIG. 13 illustrates an example flowchart for the operation of the mobile device 122. Additional, different, or fewer acts may be used.

The mobile device 122 (or navigation device 122) is configured to execute routing algorithms to determine an optimum route to travel along a road network from an origin location to a destination location in a geographic region. Using input from the end user, the navigation device 122 examines potential routes between the origin location and the destination location to determine the optimum route. The navigation device 122 may then provide the end user with information about the optimum route in the form of guidance that identifies the maneuvers required to be taken by the end user to travel from the origin to the destination location. Some navigation devices 122 show detailed maps on displays outlining the route, the types of maneuvers to be taken at various locations along the route, locations of certain types of features, and so on.

At act S201, the processor 200 or the communication interface 205 sends location data indicative of a road segment to a traffic service. The location data may be generated by the position circuitry 207. The location data may include a road segment identifier that the mobile device 122 is traveling on or near. The location data may include geographic coordinates for the location of the mobile device 122.

The location data generated by the position circuitry 207 may be referenced by a local map database stored in memory 204. The location data referenced by the local map database may be matched to a traffic provider database. The traffic map database may be a different map provider or the same map provider as the local map database. The location data is created and referenced to the traffic provider database dynamically, which means on the fly or as needed.

At act S203, the processor 200 or the communication interface 205 receives traffic data for a road strand of a road segments including the road segment from the location data. The road strand may be defined by real time traffic data, historical traffic data, road geometry (e.g., internal angle), or routing data according to any of the examples describe herein. At act S205, the processor 200 identifies an aggregate speed value for the road strand from the traffic data. The aggregate speed value may be a moving average of the traffic data. The traffic data may be filtered to determine the aggregate speed value. Outliers may be removed from the traffic data.

At act S207, the processor 200 provides, or the display 211 presents, the aggregate speed data as a representative of traffic on the plurality of adjoining road segments represented by the predetermined strand of road segments.

The aggregate speed data may be presented as part of a mapping application. For example, the workstation 128 or the mobile device 122 may present a website or another type of application that presents a map to the user. As the user scrolls the map to different geographic locations, requests are generated for the map tiles associated with the geographic locations. The aggregate speed data may be presented as part of a navigation application. As the mobile device 122 travels through a geographic area, requests are generated for the map tiles associated with the geographic locations.

In any of these examples, the aggregate speed value, or traffic data, may be presented using an application programming interface (API). The API may send location data or road segment identifiers to the server 125. The server 125 may access the strand database and return an aggregate speed value or traffic data for the strand.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
identifying speed data for a plurality of adjoining road segments;
identifying an angle between a pair of the plurality of adjoining road segments;
defining a predetermined strand of road segments as one or more pairs of the plurality of adjoining road segments with an identified angle greater than or equal to a predetermined threshold angle;
calculating, using a processor, an aggregate speed value for the predetermined strand of road segments based on the speed data for the plurality of adjoining road segments represented by the predetermined strand of road segments; and
transmitting to a navigation device the aggregate speed value as a representative of traffic on the plurality of adjoining road segments represented by the predetermined strand of road segments.

2. The method of claim 1, wherein the aggregate speed value is an average of the speed data for the plurality of adjoining road segments represented by the predetermined strand of road segments.

3. The method of claim 1, further comprising:
identifying a road segment without speed data for a current time epoch; and
interpolating an estimated speed value for the road segment without speed value.

4. The method of claim 3, wherein the estimated speed value is based on one or more road segments upstream of the road segment without speed value.

5. The method of claim 1, further comprising:
analyzing real time traffic data for the plurality of road segments; and
defining the predetermined strand of road segments according to road segments having real time traffic data that deviates within a predetermined range.

6. The method of claim 1, further comprising:
displaying a map including the aggregate speed value associated with the plurality of adjoining road segments represented by the predetermined strand of road segments.

7. The method of claim 1, wherein the speed data for a plurality of adjoining road segments is associated with a direction and the predetermined strand of road segments is associated with the direction.

8. The method of claim 1, further comprising:
analyzing historical speed data for the plurality of road segments; and
defining the predetermined strand of road segments according to road segments having historical speed data that deviates within a predetermined range.

9. The method of claim 1, further comprising:
analyzing real time speed data for the plurality of road segments; and
defining the predetermined strand of road segments according to road segments having real time speed data that deviates within a predetermined range.

10. An apparatus comprising:
at least one processor; and
at least one memory including computer program code for one or more programs; the at least one memory and the computer program code configured to, with the at least one processor, cause the apparatus to at least perform:
identify real time traffic data for a plurality of adjoining road segments;
analyze the real time traffic data for the plurality of adjoining road segments;
identify an angle between a pair of adjoining road segments of the plurality of adjoining road segments;
define a strand of road segments including one or more pairs of adjoining road segments that have real time traffic data that deviates within a predetermined range and have an identified angle greater than or equal to a predefined threshold angle;
calculate an aggregate speed value for the strand of road segments based on the speed data for the plurality of adjoining road segments represented by the strand of road segments; and
transmit, to a navigation device, the aggregate speed value as a representative of traffic on the plurality of adjoining road segments represented by the strand of road segments.

11. The apparatus of claim 10, wherein the aggregate speed value is an average of the speed data for the plurality of adjoining road segments represented by the strand of road segments.

12. The apparatus of claim 10, the at least one memory and the computer program code configured to, with the at least one processor, cause the apparatus to at least perform:
identify a road segment without speed data for a current time epoch; and
interpolate an estimated speed value for the road segment without speed value.

13. The apparatus of claim 12, wherein the estimated speed value is based on one or more road segments upstream of the road segment without speed value.

14. The apparatus of claim 10, wherein the speed data for a plurality of adjoining road segments is associated with a direction and the strand of road segments is associated with the direction.

15. A method comprising:
sending location data indicative of a road segment to a traffic service;
receiving traffic data for a road strand of a plurality of road segments including the road segment, wherein the traffic data is based on an aggregate speed value for the strand of road segments based on the speed data for the plurality of adjoining road segments represented by the strand of road segments, wherein the strand of road segments comprises one or more pairs of adjoining road segments with an angle between a pair of the adjoining road segments greater than a predefined threshold angle; and
displaying the traffic data as a representative of traffic on the plurality of adjoining road segments represented by the predetermined strand of road segments.

16. The method of claim 15, wherein the location data indicative of a road segment is referenced from a local database and matched to a provider database dynamically.

17. The method of claim 15, wherein the strand of road segments is based further on traffic data of the plurality of road segments that deviates within a predetermined range.

* * * * *